United States Patent [19]

Bergmann et al.

[11] Patent Number: 4,668,775
[45] Date of Patent: May 26, 1987

[54] α-METHINE SUBSTITUTED THIOPHENE MONOAZO DYE

[75] Inventors: Udo Bergmann, Darmstadt; Erwin Hahn, Heidelberg; Guenter Hansen, Ludwigshafen, all of Fed. Rep. of Germany

[73] Assignee: BASF Aktiengesellschaft, Ludwigshafen, Fed. Rep. of Germany

[21] Appl. No.: 758,423

[22] Filed: Jul. 24, 1985

[30] Foreign Application Priority Data

Jul. 24, 1984 [DE] Fed. Rep. of Germany ....... 3427200

[51] Int. Cl.[4] .................... C09B 29/033; C09B 29/09; C09B 29/095; C09B 29/36
[52] U.S. Cl. .................................. 534/765; 534/573; 534/588; 534/640; 534/753; 534/766; 534/768; 534/769; 534/774; 534/775; 534/777; 534/778; 534/779; 534/791; 534/794
[58] Field of Search ............... 534/640, 753, 766, 775, 534/778, 779, 794, 768, 765, 777, 769, 791, 774

[56] References Cited

U.S. PATENT DOCUMENTS

| 4,219,475 | 8/1980 | Frishberg | 534/775 X |
| 4,264,495 | 4/1981 | Maher et al. | 534/753 |
| 4,505,857 | 3/1985 | Egli | 534/794 X |
| 4,507,407 | 3/1985 | Kluger et al. | 534/753 |
| 4,554,348 | 11/1985 | Gourley | 534/794 X |

FOREIGN PATENT DOCUMENTS

| 59-152957 | 8/1984 | Japan | 534/765 |
| 59-204658 | 11/1984 | Japan | 534/778 |

Primary Examiner—Floyd D. Higel
Attorney, Agent, or Firm—Oblon, Fisher, Spivak, McClelland & Maier

[57] ABSTRACT

A compound of the formula:

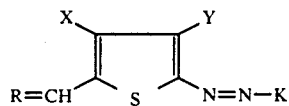

wherein K is a radical of a coupling component, R is a radical of a methylene-active compound, X is hydrogen or unsubstituted or substituted alkyl, aryl, or hetaryl and Y is cyano, nitro, alkanoyl, aroyl, alkylsulfonyl, arylsulfonyl, carboxyl, a carboxylic ester group or unsubstituted or substituted carbamyl. The present compound is useful for the dyeing of polyesters, nylons, cellulose esters and blends of polyesters and cellulose fibers.

9 Claims, No Drawings

α-METHINE SUBSTITUTED THIOPHENE MONOAZO DYE

The present invention relates to compounds of the general formula I

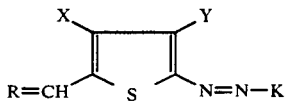
  I where K is a radical of a coupling component, R is a radical of a methylene-active compound, X is hydrogen or unsubstituted or substituted alkyl, aryl or hetaryl and Y is cyano, nitro, alkanoyl, aroyl, alkylsulfonyl, arylsulfonyl, carboxyl, a carboxylic ester group or unsubstituted or substituted carbamyl.

X is hydrogen or, for example, $C_1$–$C_8$-alkyl which may be further substituted by chlorine, bromine or phenyl, or thienyl, furyl or phenyl which is unsubstituted or substituted by chlorine, bromine, methyl, ethyl, methoxy, ethoxy or nitro.

Specific examples of alkyl radicals are $CH_3$, $C_2H_5$, $C_3H_7$, $C_4H_9$, $C_5H_{11}$, $C_6H_{13}$, $C_8H_{17}$ and

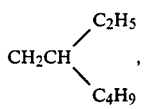

the abbreviated formula also embracing the n- and iso-radicals.

Specific examples of radicals Y, in addition to those stated above, are $CH_3CO$, $C_2H_5CO$, $C_3H_7CO$, $C_4H_9CO$, $C_5H_{11}CO$, $C_7H_{15}CO$,

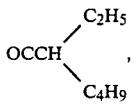

$C_6H_5CO$, $CH_3C_6H_4CO$, $ClC_6H_4CO$, $(CH_3)_2C_6H_3CO$, $H_3COC_6H_4CO$, $Cl_2C_6H_3CO$, $CH_3SO_2$, $C_2H_5SO_2$, $C_4H_9SO_2$, $C_6H_5SO_2$, $CH_3C_6H_4SO_2$, $ClC_6H_4SO_2$, $COOCH_3$, $COOC_2H_5$, $COOC_3H_7$, $COOC_4H_9$, $COOC_6H_{13}$, $COOC_8H_{17}$,

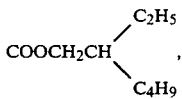

$COOC_2H_4OCH_3$, $COOC_2H_4OC_2H_5$, $COOC_2H_4OC_4H_9$, $COOC_6H_5$, $COOC_6H_4CH_3$, $CONH_2$, $CONHCH_3$, $CONHC_2H_5$, $CONHC_4H_9$, $CONHC_6H_{13}$, $CONHC_8H_{17}$, $CON(CH_3)_2$, $CON(C_2H_5)_2$, $CON(C_4H_9)_2$,

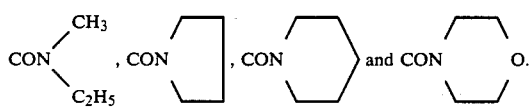

Methylene-active compounds of the formula $H_2R$ are, for example, compounds of the formula

where Y has the stated meanings, and the compounds of the formulae:

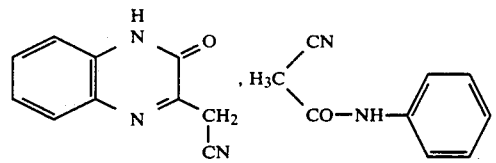
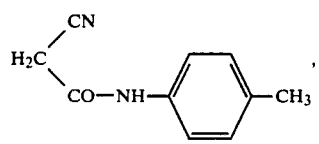
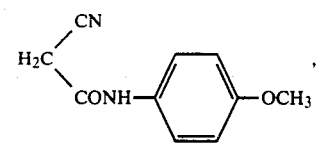
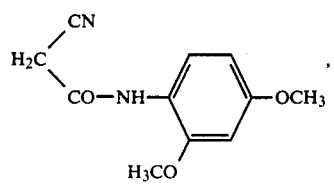
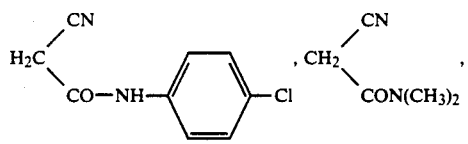
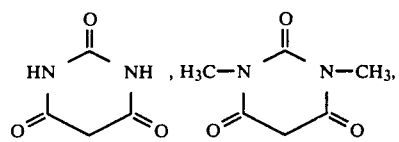
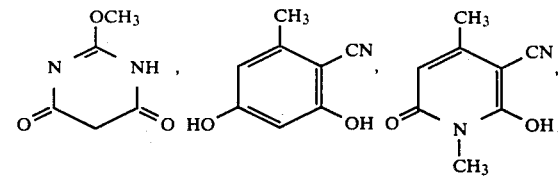
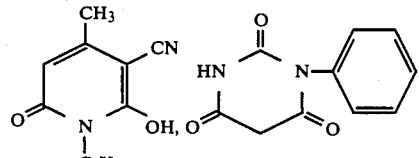
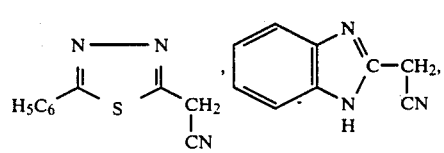

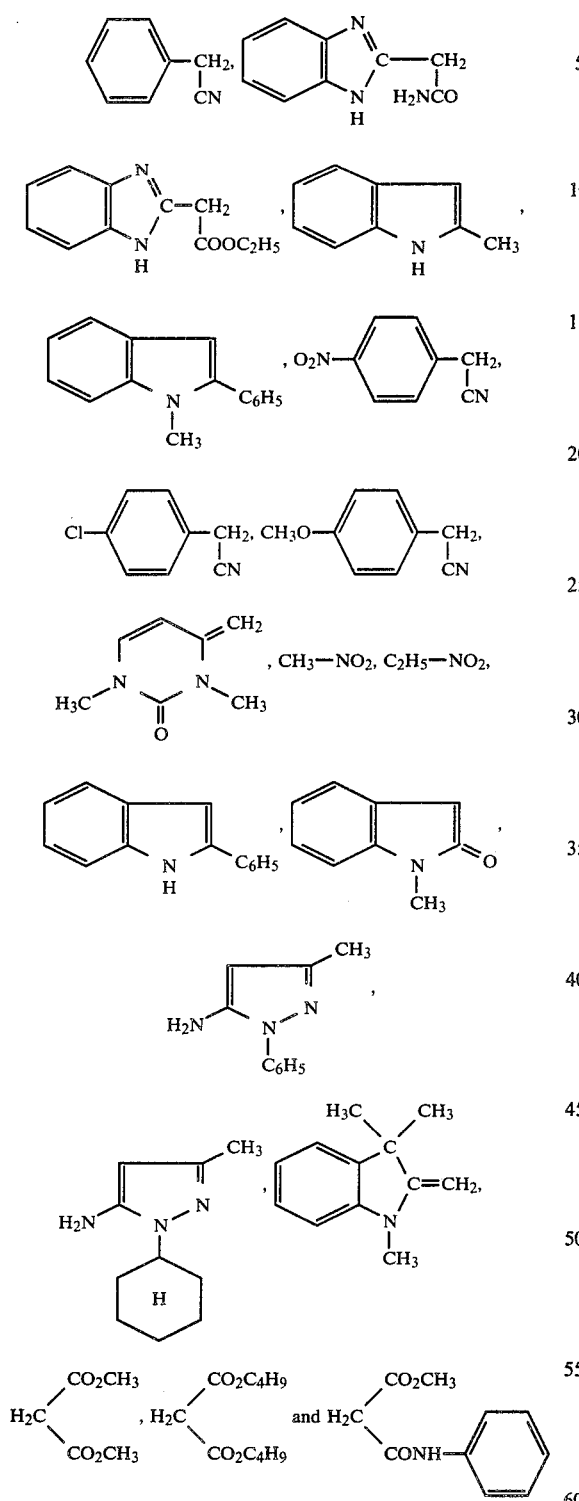

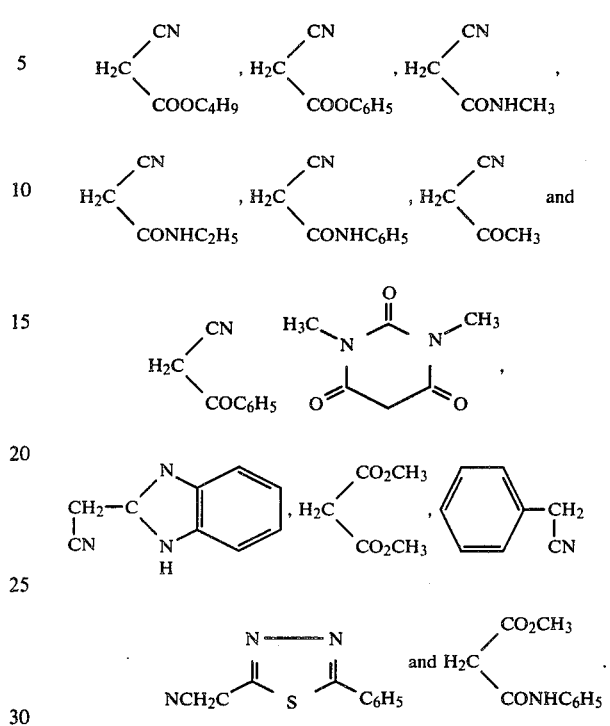

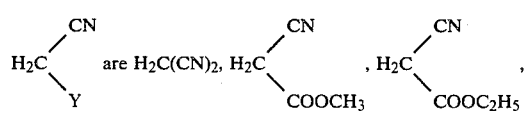

Examples of very important specific compounds of the formula

The coupling components of the formula HK are preferably derived from the aniline, α-naphthylamine, pyrazole, aminopyrazole, indole, thiazole, phenol, naphthol, pyridone or pyridine series, those of the aniline, pyrazole or thiazole series being preferred.

The coupling components HK are, in particular, of the general formulae

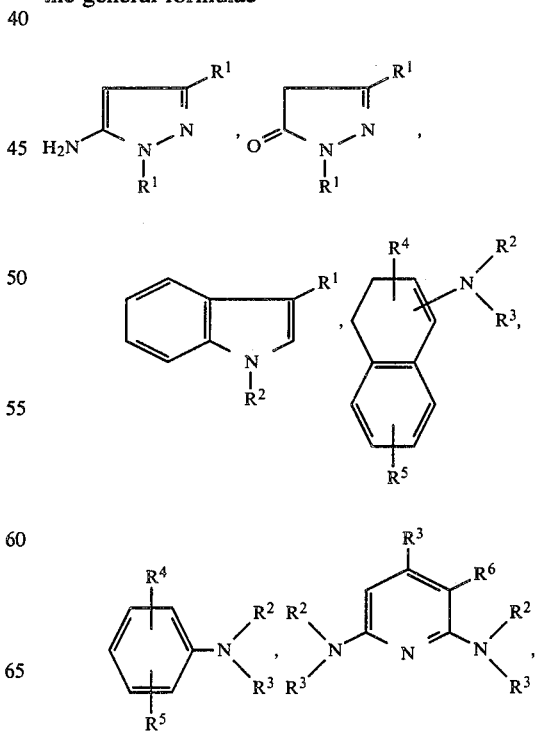

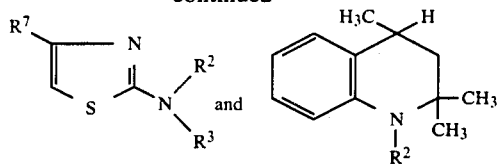

where $R^1$ is hydrogen, alkyl, aralkyl or aryl, $R^2$ is hydrogen or $R^3$, $R^3$ is unsubstituted or substituted alkyl, cycloalkyl, alkenyl, aralkyl or aryl, $R^2$ and $R^3$ together with the nitrogen form a saturated heterocyclic structure, $R^4$ and $R^5$ independently of one another are each hydrogen, alkyl, alkoxy, phenoxy, halogen, alkylsulfonylamino, dialkylaminosulfonylamino or acylamino, $R^6$ is cyano, carbamyl, nitro or carbalkoxy and $R^7$ is unsubstituted or substituted phenyl, alkyl or aralkyl.

Specific examples of radicals $R^1$ in addition to those stated above are methyl, ethyl, propyl, butyl, benzyl, phenethyl, phenyl, o-, m- and p-tolyl and o-, m- and p-chlorophenyl.

Examples of radicals $R^3$ in addition to those stated above are $C_1$–$C_6$-alkyl which may be substituted by chlorine, bromine, hydroxyl, $C_1$–$C_8$-alkoxy, phenoxy, cyano, carboxyl, $C_1$–$C_8$-alkanoyloxy, $C_1$–$C_8$-alkoxy-$C_1$–$C_4$-alkoxy, benzyoloxy, o-, m- or p-methylbenzoyloxy, o-, m- or p-chlorobenzoyloxy, $C_1$–$C_8$-alkoxyalkanoyloxy, phenoxyalkanoyloxy, $C_1$–$C_8$-alkoxycarbonyloxy, $C_1$–$C_8$-alkoxyalkoxycarbonyloxy, benzyloxycarbonyloxy, phenethyloxycarbonyloxy, phenoxyethoxycarbonyloxy, $C_1$–$C_8$-alkylaminocarbonyloxy, cyclohexylaminocarbonyloxy, phenylaminocarbonyloxy, $C_1$–$C_8$-alkoxycarbonyl, $C_1$–$C_8$-alkoxyalkoxycarbonyl, phenoxycarbonyl, benzyloxycarbonyl, phenoxy-$C_1$–$C_4$-alkoxy or phenethyloxycarbonyl, and phenyl, benzyl, phenethyl and cyclohexyl.

Specific examples of radicals $R^3$ are methyl, ethyl, propyl, butyl, pentyl, hexyl, allyl, methallyl, 2-chloroethyl, 2-bromoethyl, 2-cyanoethyl, 2-hydroxyethyl, 2-phenyl-2-hydroxyethyl, 2,3-dihydroxypropyl, 2-hydroxypropyl, 2-hydroxybutyl, 2-hydroxy-3-phenoxypropyl, 2-hydroxy-3-methoxypropyl, 2-hydroxy-3-butoxypropyl, 3-hydroxypropyl, 2-methoxyethyl, 2-ethoxyethyl, 2-propoxyethyl, 2-butoxyethyl, 2-phenoxyethyl, 2-phenoxypropyl, 2-acetoxyethyl, 2-propionyloxyethyl, 2-butyryloxyethyl, 2-isobutyryloxyethyl, 2-methoxymethylcarbonyloxyethyl, 2-ethoxymethylcarbonyloxyethyl, 2-phenoxymethylcarbonyloxyethyl, 2-methoxycarbonyloxyethyl, 2-ethoxycarbonyloxyethyl, 2-propoxycarbonyloxyethyl, 2-butoxycarbonyloxyethyl, 2-phenyloxycarbonyloxyethyl, 2-benzyloxycarbonyloxyethyl, 2-methoxyethoxycarbonyloxyethyl, 2-ethoxyethoxycarbonyloxyethyl, 2-propoxyethoxycarbonyloxyethyl, 2-butoxyethoxycarbonyloxyethyl, 2-methylaminocarbonyloxyethyl, 2-ethylaminocarbonyloxyethyl, 2-propylaminocarbonyloxyethyl, 2-butylaminocarbonyloxyethyl, 2-methoxycarbonylethyl, 2-ethoxycarbonylethyl, 2-propoxycarbonylethyl, 2-butoxycarbonylethyl, 2-phenoxycarbonylethyl, 2-benzyloxycarbonylethyl, 2--phenylethoxycarbonylethyl, 2-methoxyethoxycarbonylethyl, 2-ethoxyethoxycarbonylethyl, 2-propoxyethoxycarbonylethyl, 2-butoxyethoxycarbonylethyl, 2-phenoxyethoxycarbonylethyl and 2-benzoylethyl.

$R^2$ and $R^3$ together with the nitrogen form, for example, pyrrolidino, piperidino or morpholino.

Examples of suitable radicals $R^4$ and $R^5$ are hydrogen, methyl, ethyl, propyl, bromine, chlorine, methoxy, ethoxy, phenoxy, benzyloxy, $C_1$–$C_6$-alkanoylamino, benzylamino, $C_1$–$C_4$-alkylsulfonylamino and $C_1$–$C_4$-dialkylaminosulfonylamino.

Examples of radicals $R^6$ in addition to those stated above are aminocarbonyl, methylaminocarbonyl, dimethylaminocarbonyl, ethylaminocarbonyl, diethylaminocarbonyl, methoxycarbonyl, ethoxycarbonyl, n- and isopropoxycarbonyl, n-, iso- and sec.-butoxycarbonyl, methoxyethoxycarbonyl, ethoxyethoxycarbonyl, n- and isopropoxyethoxycarbonyl and n-, iso- and sec.-butoxyethoxycarbonyl.

$R^7$ is, for example, phenyl which is monosubstituted or polysubstituted by $C_1$–$C_{10}$-alkyl, $C_1$–$C_{10}$-alkoxy, phenoxy, benzyloxy, phenyl, chlorine, bromine, nitro, $C_1$–$C_4$-alkoxycarbonyl, $C_1$–$C_4$-monoalkylamino, $C_1$–$C_4$-dialkylamino, $C_1$–$C_4$-alkoxyethoxy, $C_1$–$C_4$-alkylmercapto, phenylmercapto or $C_1$–$C_5$-alkanoylamino, such as acetylamino, propionylamino, butyrylamino or valerylamino, or is, for example, $C_1$–$C_4$-alkyl, $C_1$–$C_4$-alkoxycarbonylmethyl, cyanomethyl or benzyl.

The compounds of the formula I have a yellow to blue hue and are particularly useful for dyeing polyesters, nylons, cellulose esters and blends of polyesters and cellulose fibers. The dyeings obtained generally possess good or very good fastness properties, particularly on polyesters.

The compounds of the formula I can be prepared by a method in which a 5-formyl compound of the diazo component of the formula

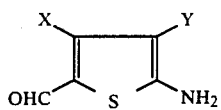

is condensed with a compound of the formula

by a conventional method to give a compound of the formula II

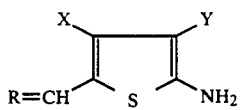

II this compound is diazotized in a conventional manner, and the product is reacted with a coupling component KH.

However, it is also possible first to diazotize a diazo component of the formula

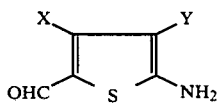

and react the product with a coupling component KH to give a monoazo dye of the formula III

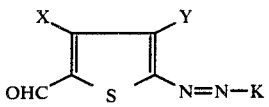

and then to condense this dye with a compound of the formula

to give a methineazo dye of the formula I

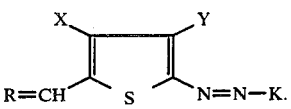

The Examples which follow illustrate the preparation. Parts and percentages are by weight, unless stated otherwise.

Of particular importance are compounds of the formula Ia

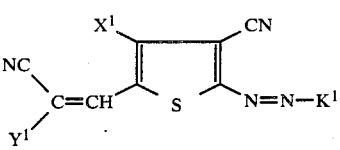

where $K^1$ is a radical of a coupling component of the aniline or thiazole series, $X^1$ is hydrogen, $C_1$–$C_8$-alkyl, benzyl, phenethyl or thienyl, furyl or phenyl which is unsubstituted or substituted by chlorine, bromine, methyl, ethyl, methoxy or ethoxy, and $Y^1$ is cyano, a carboxylic ester group or substituted carbamyl.

EXAMPLE 1

(a) 8.3 parts of 2-amino-3-cyano-4-methyl-5-formylthiophene in a mixture of 56.3 parts by volume of glacial acetic acid and 18.7 parts by volume of propionic acid were stirred. 25 parts by volume of 85% strength sulfuric acid were added, after which 16 parts of nitrosylsulfuric acid (11.5% of $N_2O_3$) were run slowly into the stirred solution at 0°–5° C. and stirring was continued for 4 hours at the same temperature. The diazonium salt solution thus obtained was run slowly into a solution of 9.75 parts of N-cyanoethyl-N-ethyl-m-toluidine in a mixture of 125 parts of water, 500 parts of ice, 25 parts by volume of 32% strength hydrochloric acid and 1 part of amidosulfonic acid. When coupling was complete, the dye was filtered off under suction, washed neutral and dried to give 15 parts of the dye of the formula

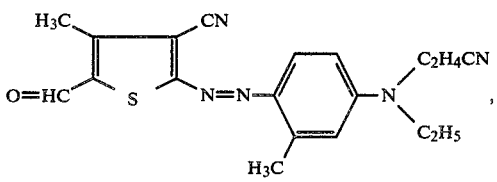

which dyes polyester fibers in violet hues.

(b) 6.2 parts of the dye described in Example 1a were dissolved in 45 parts by volume of dioxane, 3.8 parts of ethyl cyanoacetate, 1.5 parts of glacial acetic acid and 1.5 parts of piperidine were added and the mixture was stirred for 16 hours at room temperature. Thereafter, 50 parts of water and 50 parts of ice were added, stirring was continued for 1 hour and the product was filtered off under suction, washed neutral with water and dried at 40° C. under reduced pressure to give 7 parts of the dye of the formula

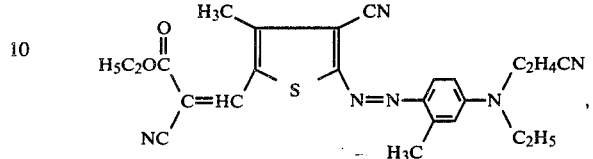

which dyes polyester fibers in dark blue hues having good lightfastness and fastness to dry heat pleating and setting.

EXAMPLE 2

Using a method similar to that described in Example 1(a), 7.6 parts of 2-amino-3-cyano-5-formylthiophene were reacted with 9.7 parts of N-cyanoethyl-N-ethyl-m-toluidine to give 13 parts of the dye of the formula

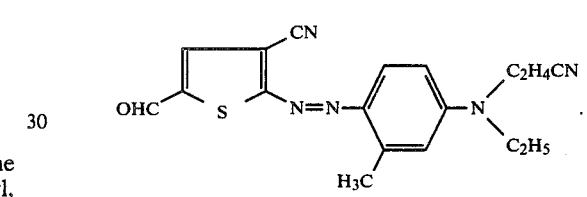

3.8 parts of ethyl cyanoacetate, 1.5 parts of glacial acetic acid and 1.5 parts of piperidine were added to 6.0 parts of this dye in 45 parts by volume of dioxane, and the mixture was stirred for 16 hours at room temperature. Thereafter, the dye was precipitated by adding 50 parts of water and 50 parts of ice, the mixture was stirred for 1 hour and the product was filtered off under suction, washed neutral with water and dried to give 7 parts of the dye of the formula

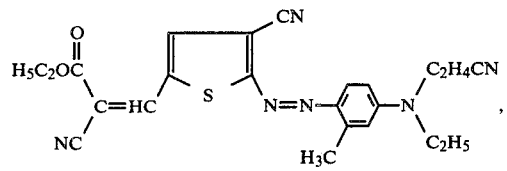

which dyes polyesters in fast dark blue hues.

EXAMPLE 3

12.4 parts of the dye of the formula

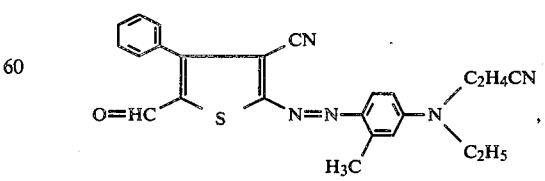

in 80 parts by volume of dioxane were stirred with 6.8 parts of ethyl cyanoacetate, 2.5 parts of glacial acetic acid and 2.5 parts of piperidine for 16 hours at room temperature. Thereafter, the mixture was diluted with 200 parts of an ice/water mixture, and the product was filtered off and dried to give 14.7 parts of the dye of the formula

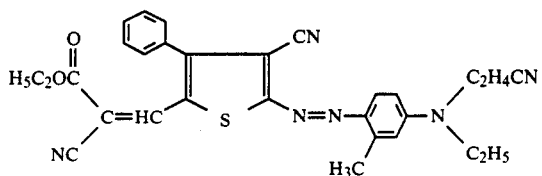

which gives, on polyesters, dark blue dyeings which are lightfast and fast to dry heat pleating and setting.

EXAMPLE 4

Using a method similar to that described in Example 1(b), 13.5 parts of the dye of the formula

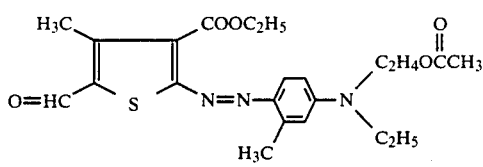

were reacted with 7.5 parts of n-butyl cyanoacetate to give 14 parts of the dye of the formula

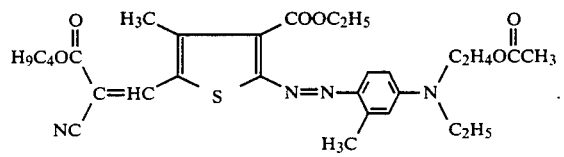

Dark blue dyeings having good general fastness properties were obtained on polyesters.

EXAMPLE 5

Using a method similar to that described in Example 1(a), 8.3 parts of 2-amino-3-cyano-4-methyl-5-formyl-thiophene were reacted with 12.3 parts of N,N-diethyl-3-aminoacetanilide to give 14 parts of the dye of the formula

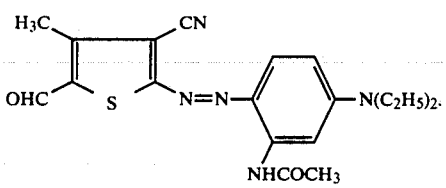

6.5 parts of this compound were dissolved in 45 parts by volume of dioxane, 3.8 parts of ethyl cyanoacetate, 1.5 parts of glacial acetic acid and 1.5 parts of piperidine were added and the mixture was stirred for 16 hours at room temperature. Working up by a procedure similar to that described in Example 1 gave 7 parts of the dye of the formula

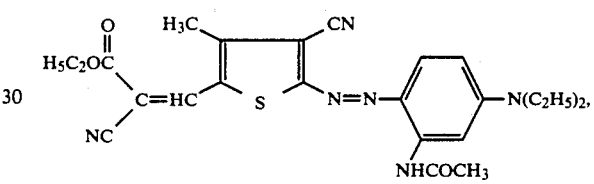

which, on polyesters, gives clear blue dyeings which in particular possess very good lightfastness and fastness to dry heat pleating and setting.

The dyes defined in the Table below were obtained similarly to Examples 1–5.

| Example No. | X | Y | $Y^1$ | $Y^2$ | K | |
|---|---|---|---|---|---|---|
| 6 | H | CN | $COOC_2H_5$ | $COOC_2H_5$ | phenyl-N($C_2H_4CN$)($C_2H_5$), 3-$CH_3$ | dark blue |
| 7 | H | CN | $COOC_2H_5$ | $COOC_2H_5$ | phenyl-N($C_4H_9$)($C_2H_4CN$) | bluish violet |
| 8 | H | CN | $COOC_2H_5$ | $COOC_2H_5$ | phenyl-N($C_2H_5$)$_2$, $OCH_3$ | dark blue |

-continued

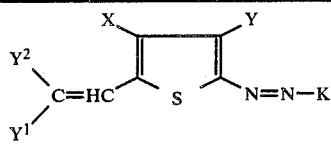

| Example No. | X | Y | Y¹ | Y² | K | * |
|---|---|---|---|---|---|---|
| 9 | H | CN | COOC$_2$H$_5$ | COOC$_2$H$_5$ | ![]—C$_6$H$_3$(NHCOCH$_3$)—N(C$_4$H$_9$)$_2$ | blue |
| 10 | H | CN | CN | CN | ![]—C$_6$H$_3$(CH$_3$)—N(C$_2$H$_5$)(C$_2$H$_4$CN) | dark blue |
| 11 | H | CN | COCH$_3$ | COOC$_2$H$_5$ | ![]—C$_6$H$_3$(CH$_3$)—N(C$_2$H$_5$)(C$_2$H$_4$CN) | dark blue |
| 12 | H | COOC$_2$H$_5$ | CN | COOC$_2$H$_5$ | ![]—C$_6$H$_4$—N(C$_2$H$_5$)$_2$ | bluish violet |
| 13 | H | COOC$_2$H$_5$ | CN | COOC$_2$H$_5$ | ![]—C$_6$H$_3$(CH$_3$)—N(C$_2$H$_4$OCOCH$_3$)$_2$ | dark blue |
| 14 | H | COOC$_2$H$_5$ | CN | COOC$_2$H$_5$ | ![]—C$_6$H$_3$(NHCOCH$_3$)—N(C$_2$H$_5$)$_2$ | blue |
| 15 | H | COOC$_2$H$_5$ | COOC$_2$H$_5$ | COOC$_2$H$_5$ | ![]—C$_6$H$_3$(CH$_3$)—N(C$_2$H$_5$)(C$_2$H$_4$CN) | dark blue |
| 16 | H | COOC$_2$H$_5$ | COCH$_3$ | COOC$_2$H$_5$ | ![]—C$_6$H$_3$(CH$_3$)—N(C$_2$H$_5$)(C$_2$H$_4$CN) | dark blue |
| 17 | H | COOC$_2$H$_5$ | COCH$_3$ | COCH$_3$ | ![]—C$_6$H$_3$(CH$_3$)—N(C$_2$H$_5$)(C$_2$H$_4$CN) | bluish violet |

-continued

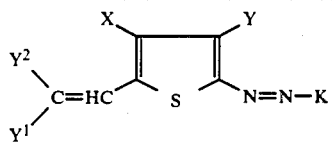

| Example No. | X | Y | Y¹ | Y² | K | * |
|---|---|---|---|---|---|---|
| 18 | H | COOC$_2$H$_5$ | COCH$_3$ | CN | ![K: 4-methyl-3-methyl-N(C$_2$H$_5$)(C$_2$H$_4$CN)-phenyl] | dark blue |
| 19 | H | $\underset{C-NH_2}{\overset{O}{\|}}$ | CN | COOC$_2$H$_5$ | ![K: 4-methyl-3-methyl-N(C$_2$H$_4$CN)(CH$_2$CH=CH$_2$)-phenyl] | dark blue |
| 20 | H | $\underset{C-NH_2}{\overset{O}{\|}}$ | CN | COOC$_2$H$_5$ | ![K: 4-methyl-3-NHCOCH$_3$-N(C$_2$H$_5$)$_2$-phenyl] | blue |
| 21 | H | SO$_2$CH$_3$ | CN | COOC$_2$H$_5$ | ![K: 4-methyl-3-methyl-N(C$_2$H$_5$)(C$_2$H$_4$CN)-phenyl] | dark blue |
| 22 | H | SO$_2$CH$_3$ | CN | COOC$_2$H$_5$ | ![K: 4-methyl-3-methyl-N(CH$_2$CH=CH$_2$)$_2$-phenyl] | dark blue |
| 23 | H | SO$_2$CH$_3$ | CN | COOC$_2$H$_5$ | ![K: 4-methyl-3-NHCOCH$_3$-N(C$_2$H$_5$)$_2$-phenyl] | blue |
| 24 | H | CN | CN | COOC$_2$H$_5$ | ![K: 4-methyl-N(C$_2$H$_5$)(C$_2$H$_4$CN)-phenyl] | bluish violet |
| 25 | H | CN | CN | COOC$_2$H$_5$ | ![K: 4-methyl-N(C$_2$H$_4$OCOCH$_3$)$_2$-phenyl] | bluish violet |
| 26 | H | CN | CN | COOC$_2$H$_5$ | ![K: 4-methyl-3-methyl-N(C$_2$H$_4$CN)(CH$_2$CH=CHCl)-phenyl] | dark blue |

-continued

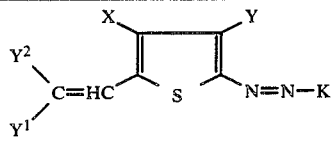

| Example No. | X | Y | Y¹ | Y² | K | * |
|---|---|---|---|---|---|---|
| 27 | H | CN | CN | COOC$_2$H$_5$ | 4-[N(C$_2$H$_5$)(C$_2$H$_4$OCOCH$_3$)]-3-methylphenyl | dark blue |
| 28 | H | CN | CN | COOC$_2$H$_5$ | 4-[N(C$_2$H$_5$)(C$_2$H$_4$COOCH$_3$)]-3-methylphenyl | dark blue |
| 29 | H | CN | CN | COOC$_2$H$_5$ | 4-N(C$_2$H$_5$)$_2$-3-methylphenyl | dark blue |
| 30 | H | CN | CN | COOC$_2$H$_5$ | 4-N(C$_4$H$_9$)$_2$-3-methylphenyl | dark blue |
| 31 | H | CN | CN | COOC$_2$H$_5$ | 4-N(C$_2$H$_5$)$_2$-2-NHCOCH$_3$-phenyl | blue |
| 32 | H | CN | CN | COOC$_2$H$_5$ | 4-phenyl-5-methyl-2-N(C$_2$H$_5$)$_2$-thiazolyl | blue |
| 33 | H | CN | CN | COOC$_2$H$_5$ | 4-CH$_3$-3-CN-2-NHC$_4$H$_9$-6-NHC$_4$H$_9$-pyridyl | blue |
| 34 | CH$_3$ | CN | CN | COOC$_2$H$_5$ | 4-[N(C$_2$H$_5$)(C$_2$H$_4$OCOCH$_3$)]phenyl | bluish violet |
| 35 | CH$_3$ | CN | CN | COOC$_2$H$_5$ | 4-[N(C$_2$H$_5$)(C$_2$H$_4$CN)]phenyl | bluish violet |

-continued

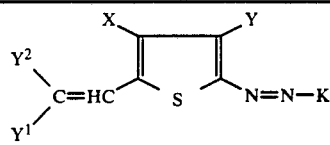

| Example No. | X | Y | Y¹ | Y² | K | * |
|---|---|---|---|---|---|---|
| 36 | $CH_3$ | CN | CN | $COOC_2H_5$ | ![] 4-N($C_2H_5$)($C_2H_4OCH_3$)-phenyl | bluish violet |
| 37 | $CH_3$ | CN | CN | $COOC_2H_5$ | 4-N($C_2H_5$)$_2$-3-$CH_3$-phenyl | dark blue |
| 38 | $CH_3$ | CN | CN | $COOC_2H_5$ | 4-N($C_2H_4CN$)($CH_2CH=CH_2$)-3-$CH_3$-phenyl | dark blue |
| 39 | $CH_3$ | CN | CN | $COOC_2H_5$ | 4-N($C_2H_4OCH_3$)($C_2H_4CN$)-3-$CH_3$-phenyl | dark blue |
| 40 | $CH_3$ | CN | CN | $COOC_2H_5$ | 4-N($C_2H_4OCOCH_3$)$_2$-3-$CH_3$-phenyl | dark blue |
| 41 | $CH_3$ | CN | CN | $COOC_2H_5$ | 4-N($C_2H_4CN$)($C_2H_4OCONHC_4H_9$)-3-$CH_3$-phenyl | dark blue |
| 42 | $CH_3$ | CN | CN | $COOC_2H_5$ | 4-NHC$_2$H$_4$COOCH$_3$-2,5-di-$CH_3$-phenyl | dark blue |
| 43 | $CH_3$ | CN | CN | $COOC_4H_9(n)$ | 4-N($C_2H_5$)($C_2H_4OCOC_2H_5$)-3-$CH_3$-phenyl | dark blue |
| 44 | $CH_3$ | CN | CN | $COOC_4H_9(n)$ | 4-N($C_4H_9$)$_2$-3-NHCOCH$_3$-phenyl | blue |

-continued

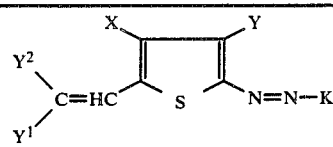

| Example No. | X | Y | Y¹ | Y² | K | ° |
|---|---|---|---|---|---|---|
| 45 | $CH_3$ | CN | CN | $COOC_4H_9(n)$ | -C₆H₃(NHCOCH₃)-N(C₂H₅)₂ | blue |
| 46 | $CH_3$ | CN | CN | $COOC_4H_9(n)$ | -C₆H₃(CH₃)-NHC₂H₄COOC₄H₉ | blue |
| 47 | $CH_3$ | CN | CN | $COOC_4H_9(n)$ | -C₆H₃(CH₃)-N(C₂H₅)(C₂H₄COC₂H₄OC₂H₅) | dark blue |
| 48 | $CH_3$ | CN | CN | CO—NH—C₆H₅ | -C₆H₃(CH₃)-N(C₂H₅)(C₂H₄CN) | dark blue |
| 49 | $CH_3$ | CN | CN | —C₆H₅ | -C₆H₃(CH₃)-N(C₂H₅)(C₂H₄CN) | dark blue |
| 50 | $CH_3$ | CN | CN | benzotriazol-2-yl | -C₆H₃(CH₃)-N(C₂H₅)(C₂H₄CN) | dark blue |
| 51 | $CH_3$ | CN | CN | $CONH_2$ | -C₆H₃(CH₃)-N(C₂H₅)(C₂H₄CN) | dark blue |
| 52 | $CH_3$ | CN | $COOC_2H_5$ | $COOC_2H_5$ | -C₆H₄-N(C₄H₉)₂ | navy |
| 53 | $CH_3$ | CN | $COCH_3$ | $COOC_2H_5$ | -C₆H₃(CH₃)-N(CH₂CH=CH₂)(C₂H₄OH) | dark blue |
| 54 | $CH_3$ | CN | CN | $CONHCH_3$ | ″ | dark blue |

-continued

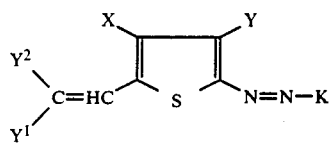

| Example No. | X | Y | Y¹ | Y² | K | * |
|---|---|---|---|---|---|---|
| 55 | $CH_3$ | $COOC_2H_5$ | CN | CN | 4-$N(C_2H_5)_2$, 2-$NHCOCH_3$ phenyl | blue |
| 56 | $CH_3$ | $COOC_2H_5$ | CN | $COOC_4H_9$ | 4-$N(C_2H_4OC_2H_5)_2$, 3-$CH_3$ phenyl | dark blue |
| 57 | $CH_3$ | $COOC_2H_5$ | CN | $CON(CH_3)_2$ | 4-$N(C_2H_4OCOCH_3)_2$ phenyl | bluish violet |
| 58 | $CH_3$ | $CONH_2$ | CN | $COOC_2H_5$ | 4-$N(C_2H_4CN)(C_2H_5)$, 3-$CH_3$ phenyl | dark blue |
| 59 | $CH_3$ | $SO_2CH_3$ | CN | $COOC_2H_5$ | 4-$N(C_2H_4CN)(C_2H_5)$, 3-$CH_3$ phenyl | dark blue |
| 60 | $CH_3$ | $CON(CH_3)_2$ | CN | $COOC_2H_5$ | 4-$N(C_2H_4CN)(C_2H_5)$, 3-$CH_3$ phenyl | dark blue |
| 61 | $CH_3$ | CN | CN | $COOC_2H_5$ | pyridine: $CH_3$, CN, $NHC_2H_4OCH_3$, $NHC_2H_4OCH_3$ | dark blue |
| 62 | $CH_3$ | CN | CN | $COOC_2H_5$ | 4-$CH_3O$-phenyl thiazole-$N(C_2H_5)_2$ | navy |

-continued

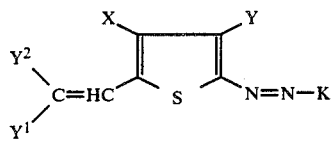

| Example No. | X | Y | Y¹ | Y² | K | ° |
|---|---|---|---|---|---|---|
| 63 | $CH_3$ | CN | CN | $COOCH_3$ | thiophene-thiazole with $N(C_2H_5)_2$ | navy |
| 64 | $CH_3$ | CN | CN | $COOCH_3$ | methyl-naphthyl-$NHC_2H_4OH$ | navy |
| 65 | $CH_3$ | CN | CN | $COOC_2H_5$ | methyl-phenyl with $N(C_2H_5)_2$ and $NHSO_2CH_3$ | navy |
| 66 | $CH_3$ | CN | CN | $COOC_2H_5$ | 3-methyl-5-hydroxy-1-phenylpyrazole | violet |
| 67 | $CH_3$ | CN | CN | $COOC_2H_5$ | 5-amino-4-methyl-1-benzylpyrazole | violet |
| 68 | $CH_3$ | CN | CN | $COOC_2H_5$ | N-methyl-2-phenylindole | violet |
| 69 | $CH_3$ | CN | CN | $CONHCH_3$ | dimethylphenyl-$N(C_2H_4CN)(CH_2CH=CH_2)$ | dark blue |

-continued $$\begin{array}{c} Y^2 \\ \diagdown \\ Y^1 \end{array} C=HC \begin{array}{c} X \\ \diagup \\ S \end{array} \begin{array}{c} Y \\ \diagdown \\ N=N-K \end{array}$$

| Example No. | X | Y | Y$^1$ | Y$^2$ | K | * |
|---|---|---|---|---|---|---|
| 70 | CH$_3$ | CN | CN | CONHC$_2$H$_5$ | 3-methyl-4-[N-(C$_2$H$_4$CN)(CH$_2$CH=CH$_2$)]aminophenyl | dark blue |
| 71 | CH$_3$ | CN | CN | SO$_2$CH$_3$ | 3-methyl-4-[N-(C$_2$H$_4$CN)(CH$_2$CH=CH$_2$)]aminophenyl | dark blue |
| 72 | CH$_3$ | CN | CN | COCH$_3$ | 3-methyl-4-[N-(C$_2$H$_4$CN)(CH$_2$CH=CH$_2$)]aminophenyl | dark blue |
| 73 | CH$_3$ | CN | CN | COOCH$_3$ | 3-methyl-4-[N-(C$_2$H$_4$CN)(CH$_2$CH=CH$_2$)]aminophenyl | dark blue |
| 74 | CH$_3$ | CN | CN | C$_6$H$_5$ | 3-methyl-4-[N-(C$_2$H$_4$CN)(CH$_2$CH=CH$_2$)]aminophenyl | dark blue |
| 75 | C$_6$H$_5$ | CN | CN | COOC$_2$H$_5$ | 4-N(CH$_3$)$_2$-phenyl | dark blue |
| 76 | C$_6$H$_5$ | CN | CN | COOC$_2$H$_5$ | 4-N(C$_2$H$_5$)$_2$-phenyl | dark blue |
| 77 | C$_6$H$_5$ | CN | CN | COOC$_2$H$_5$ | 3-methyl-4-N(CH$_2$CH=CH$_2$)$_2$-phenyl | dark blue |
| 78 | C$_6$H$_5$ | CN | CN | COOC$_2$H$_5$ | 4-[N-(C$_2$H$_5$)(C$_2$H$_4$OCOCH$_3$)]aminophenyl | dark blue |
| 79 | C$_6$H$_5$ | CN | CN | COOC$_2$H$_5$ | 4-[N-(CH$_2$CH=CH$_2$)(C$_2$H$_4$CN)]aminophenyl | dark blue |

-continued

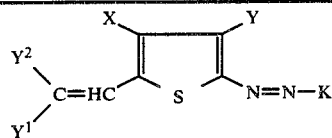

| Example No. | X | Y | Y¹ | Y² | K | * |
|---|---|---|---|---|---|---|
| 80 | $C_6H_5$ | $COOC_2H_5$ | CN | $COOC_2H_5$ | ![]  -C6H4-N(CH2CH=CH2)(C2H4CN) | dark blue |
| 81 | 4-$CH_3O$—$C_6H_4$— | CN | CN | $COOC_2H_5$ | -C6H3(CH3)-N(C2H5)2 | navy |
| 82 | 4-$CH_3$—$C_6H_4$— | CN | CN | $COOC_2H_5$ | -C6H3(CH3)-N(C2H5)2 | navy |
| 83 | 4-Cl—$C_6H_4$— | CN | CN | $COOC_2H_5$ | -C6H3(CH3)-N(C2H5)2 | navy |

*Dyeing on polyesters

EXAMPLE 84

(a) 25 parts of 2-amino-3-cyano-4-methyl-5-formylthiophene were dissolved in 200 parts by volume of ethanol, and 2 parts of glacial acetic acid and 2 parts of piperidine were added. Thereafter, 50 parts by volume of ethyl cyanoacetate were added dropwise at room temperature, and the mixture was stirred for 7 hours at 60° C. and then stirred into 500 parts of an ice/water mixture, and the precipitate was filtered off under suction, washed with water and dried at 60° C. under reduced pressure to give 31.5 parts of 2-amino-3-cyano-4-methyl-5-(($\beta$-cyano-$\beta$-carboethoxy)-vinyl)-thiophene of the formula

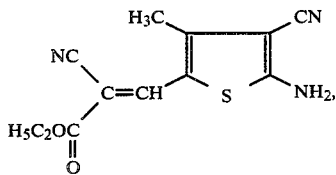

which was reacted without further purification.

(b) 13 parts of 2-amino-3-cyano-4-methyl-5-(($\beta$-cyano-$\beta$-carboethoxy)-vinyl)-thiophene were suspended in 100 parts by volume of 85% strength phosphoric acid, and 16 parts of nitrosylsulfuric acid (11.5% of $N_2O_3$) were added slowly at 0°–5° C. After 2 hours at this temperature, the diazonium salt solution was run into a solution of 9.75 parts of N-cyanoethyl-N-ethyl-m-toluidine in a mixture of 125 parts of water, 500 parts of ice, 25 parts by volume of 32% strength hydrochloric acid and 1 part of amidosulfonic acid. When coupling was complete, the dye was filtered off under suction, washed neutral and dried under reduced pressure to give 20 parts of the dye of the formula

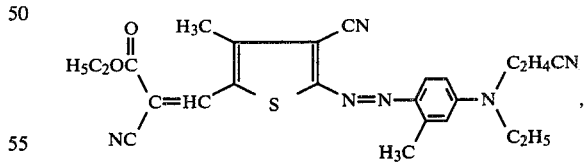

described in Example 1(b).

EXAMPLE 85

16.2 parts of 2-amino-3-cyano-4-phenyl-5-(($\beta$-cyano-$\beta$-carboethoxy)-vinyl)-thiophene were suspended in 160 parts by volume of 85% strength phosphoric acid and diazotized with 16 parts of nitrosylsulfuric acid (11.5% of $N_2O_3$) at 0°–5° C. After 2 hours at this temperature, the diazonium salt solution was reacted with 9.75 parts of N-cyanoethyl-N-ethyl-m-toluidine, using a procedure similar to Example 84(b), to give 23 parts of the dye of the formula

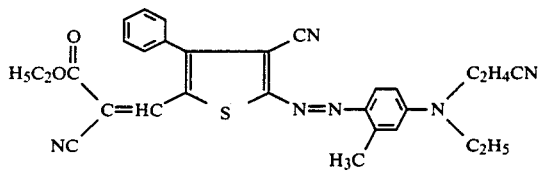

which gives, on polyesters, navy dyeings possessing good lightfastness and fastness to dry heat pleating and setting.

EXAMPLE 86

11.6 parts of 2-amino-3-cyano-5-((β-cyano-β-methylaminocarbonyl)-vinyl)-thiophene were suspended in 120 parts by volume of 85% strength phosphoric acid and reacted with 16 parts of nitrosylsulfuric acid at 0°–5° C., and the mixture was stirred for 2 hours at this temperature. The diazonium salt solution was slowly run into a mixture of 7.5 parts of N,N-diethylaniline, 100 parts of water, 300 parts of ice, 25 parts by volume of 32% strength hydrochloric acid and 1 part of amidosulfonic acid. When coupling was complete, the suspension was filtered and the product was washed neutral and dried to give 16 parts of the dye of the formula

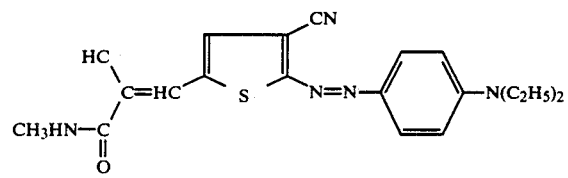

which, on polyesters, gives dark blue dyeings possessing good general fastness properties.

The compounds defined in the Table below were also obtained similarly to Examples 84–86.

| Example No. | X | Y | Y¹ | Y² | K | • |
|---|---|---|---|---|---|---|
| 87 | H | CN | CN | COOCH₃ | —C₆H₄—N(C₂H₅)₂ | dark blue |
| 88 | H | CN | CN | COOCH₃ | —C₆H₄—N(C₂H₄OCOCH₃) | dark blue |
| 89 | H | CN | CN | COOCH₃ | —C₆H₃(NHCOCH₃)—N(C₂H₅)₂ | blue |
| 90 | H | CN | CN | COOCH₃ | phenyl-thiazole-N(C₂H₅)₂ | blue |
| 91 | CH₃ | CN | CN | COOC₂H₅ | —C₆H₄—N(CH₂CH=CH₂)₂ | dark blue |
| 92 | CH₃ | CN | CN | COOC₂H₅ | —C₆H₃(CH₃)—N(C₄H₉)₂ | dark blue |
| 93 | CH₃ | CN | CN | COOC₂H₅ | —C₆H₄—N(C₂H₄CN)(CH₂CH=CH₂) | dark blue |

-continued

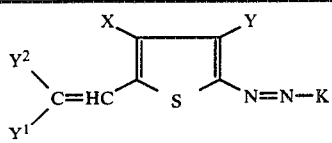

| Example No. | X | Y | Y¹ | Y² | K | * |
|---|---|---|---|---|---|---|
| 94 | $CH_3$ | CN | CN | $COOC_2H_5$ | (phenyl-C(=)-thiazole-N($C_2H_5$)$_2$) | dark blue |
| 95 | $CH_3$ | CN | CN | $CONHCH_3$ | —C$_6$H$_4$—N($C_2H_5$)$_2$ | dark blue |
| 96 | $CH_3$ | $COOCH_3$ | CN | $COOC_2H_5$ | —C$_6$H$_4$—N($C_2H_5$)$_2$ | dark blue |
| 97 | $CH_3$ | $SO_2CH_3$ | CN | $COOC_2H_5$ | 3-CH$_3$-C$_6$H$_3$-N($C_2H_5$)($C_2H_4CN$) | dark blue |
| 98 | $CH_3$ | CN | CN | $COOC_2H_5$ | H$_3$C, CN, NHC$_2$H$_4$OCH$_3$, N, NHC$_2$H$_4$OCH$_3$ | bluish violet |
| 99 | $C_6H_5$ | CN | CN | $COOC_2H_5$ | 3-CH$_3$-C$_6$H$_3$-N(CH$_2$CH=CH$_2$)(C$_2$H$_4$CN) | dark blue |
| 100 | $C_6H_5$ | CN | CN | $COOC_2H_5$ | —C$_6$H$_4$—N($C_4H_9$)$_2$ | dark blue |
| 101 | $C_6H_5$ | CN | CN | $COOC_2H_5$ | 3-OCH$_3$-C$_6$H$_3$-N($C_2H_5$)$_2$ | navy |

*Dyeing on polyesters

The dyes characterized by the substituents in the Table below were prepared similarly to the methods described for Example No. 7.

| Example No. | X | Y | Y¹ | Y² | K | (*) |
|---|---|---|---|---|---|---|
| 102 | H | CN | CN | COOC$_2$H$_5$ | 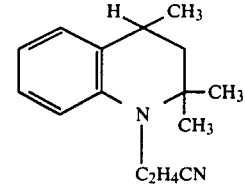 | dark blue |
| 103 | H | CN | CN | COOC$_2$H$_5$ | 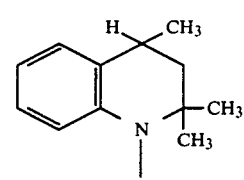 | blue |
| 104 | H | CN | CN | CN | 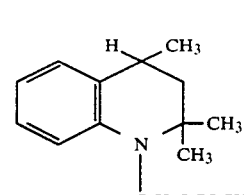 | blue |
| 105 | H | CN | CN | COOC$_2$H$_5$ | 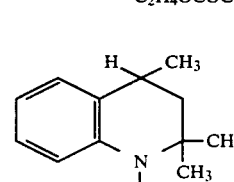 | blue |
| 106 | H | CN | CN | COOC$_2$H$_5$ | 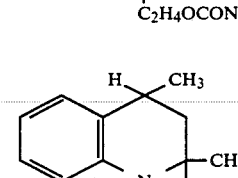 | dark blue |
| 107 | H | CN | CN | COOC$_2$H$_5$ | 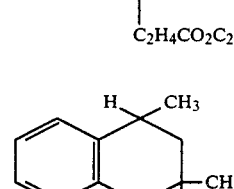 | blue |
| 108 | CH$_3$ | CN | CN | COOC$_2$H$_5$ | 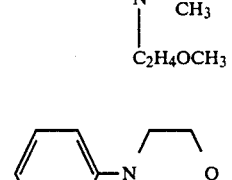 | navy |
| 109 | CH$_3$ | CN | CN | COOC$_2$H$_5$ | 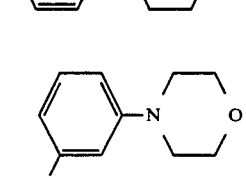 | navy |

-continued

| Example No. | X | Y | Y¹ | Y² | K | (*) |
|---|---|---|---|---|---|---|
| 110 | CH₃ | CN | CN | CN |  | blue |

(*) Dyeing on polyesters

The dyes below were obtained using N,N-dimethyl-barbituric acid as the starting material:

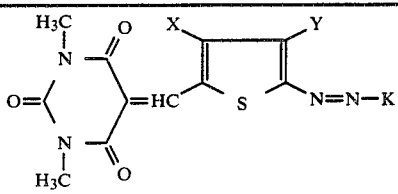

| Example No. | X | Y | K | (*) |
|---|---|---|---|---|
| 111 | H | CN |  | dark blue |
| 112 | CH₃ | CN | 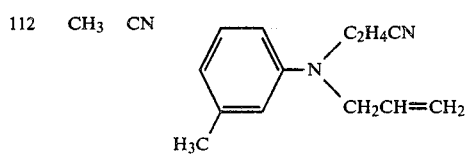 | bluish violet |
| 113 | C₆H₅ | CN | 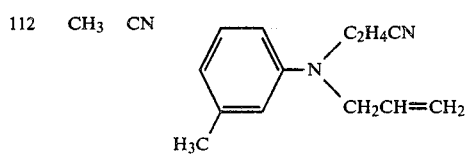 | dark blue |
| 114 | CH₃ | CN | 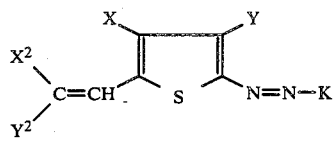 | blue |
| 115 | H | CN |  | bluish violet |

(*) Dyeing on polyesters

We claim:
1. A compound of formula I:

wherein X² is cyano and Y² is CN, NO₂, CH₃CO, C₂H₅CO, C₃H₇CO, C₄H₉CO, C₅H₁₁CO, C₇H₁₅CO, (C₄H₉)(C₂H₅)CHCO, C₆H₅CO, CH₃C₆H₄CO, ClC₆H₄CO, (CH₃)₂C₆H₃CO, CH₃OC₆H₄CO, Cl₂C₆H₂CO, CH₃SO₂, C₂H₅SO₂, C₄H₉SO₂, C₆H₅SO₂, CH₃C₆H₄SO₂, ClC₆H₄SO₂, carboxyl, COOCH₃, COOC₂H₅, COOC₃H₇, COOC₄H₉, COOC₆H₁₃, COOC₈H₁₇, (C₄H₉)(C₂H₅)CHCH₂OOC, CH₃OC₂H₄OOC, C₂H₅OC₂H₄OOC, C₄H₉OC₂H₄OOC, C₆H₅OOC, CH₃C₆H₄OOC, CONH₂, CONHCH₃, CONHC₂H₅, CONHC₄H₉, CONHC₆H₅, CONHC₆H₁₃, CONH(C₆H₄—CH₃—p), CONHC₈H₁₇, CON(CH₃)₂, CON(C₂H₅)₂, CON(C₄H₉)₂, (CH₃)(C₂H₅)NOC, CONH(C₆H₄—OCH₃—p), CONH(C₆H₃—OCH₃—m, —OCH₃—p), CONH(C₆H₄—Cl—p), C₆H₅, C₆H₄—NO₂—p, C₆H₄—Cl—p, C₆H₄—OCH₃—p,

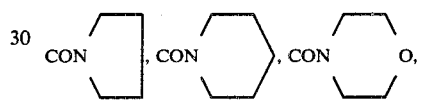

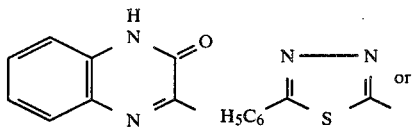

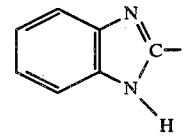

or group

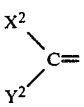

is a member selected from the group consisting of

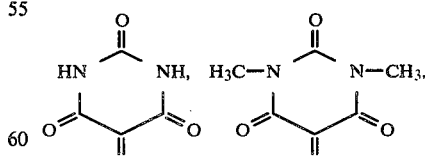

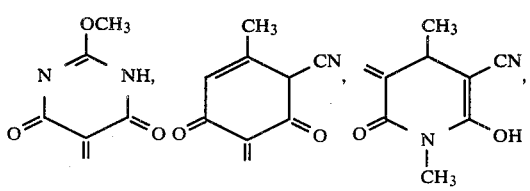

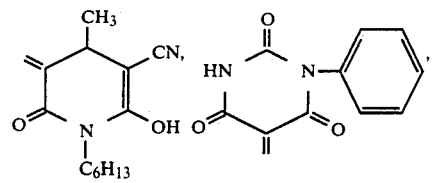

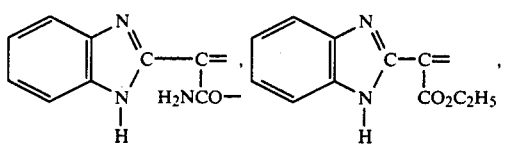

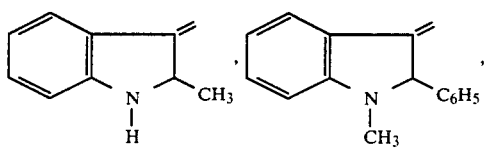

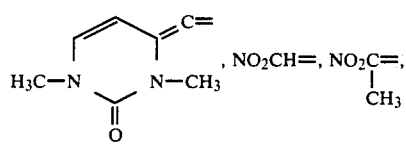

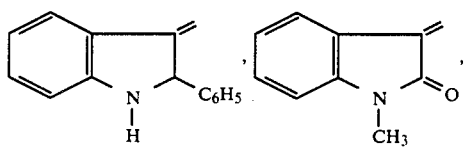

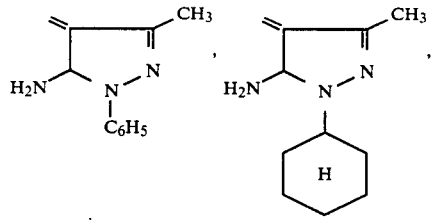

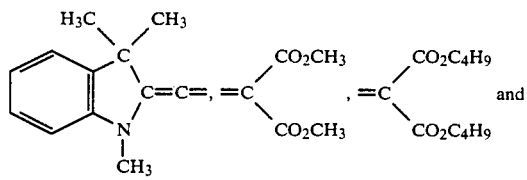

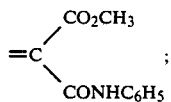

X is hydrogen $C_1$-$C_8$-alkyl, $C_1$-$C_8$-alkyl substituted by chlorine, bromine or phenyl, thienyl, furyl, phenyl or phenyl substituted by chlorine, bromine, methyl, ethyl, methoxy, ethoxy or nitro; Y is cyano, nitro, $CH_3CO$, $C_2H_5CO$, $C_3H_7CO$, $C_4H_9CO$, $C_5H_{11}CO$, $C_7H_{15}CO$,

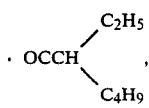

$C_6H_5CO$, $CH_3C_6H_4CO$, $ClC_6H_4CO$, $(CH_3)_2C_6H_3CO$, $H_3COC_6H_4CO$, $Cl_2C_6H_3CO$, $CH_3SO_2$, $C_2H_5SO_2$, $C_4H_9SO_2$, $C_6H_5SO_2$, $CH_3C_6H_4SO_2$, $ClC_6H_4SO_2$, carboxyl, $COOCH_3$, $COOC_2H_5$, $COOC_3H_7$, $COOC_4H_9$, $COOC_6H_{13}$, $COOC_8H_{17}$, $COOCH_2CH(C_4H_9)(C_2H_5)$, $COOC_2H_4OCH_3$, $COOC_2H_4OC_2H_5$, $COOC_2H_4OC_4H_9$, $COOC_6H_5$, $COOC_6H_4CH_3$, $CONH_2$, $CONHCH_3$, $CONHC_2H_5$, $CONHC_4H_9$, $CONHC_6H_{13}$, $CONHC_8H_{17}$, $CON(CH_3)_2$, $CON(C_2H_5)_2$, $CON(C_4H_9)_2$, $CON(CH_3)(C_2H_5)$,

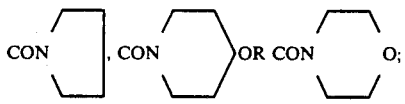

and K is derived from HK which is a compound selected from the group consisting of:

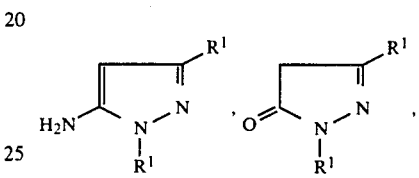

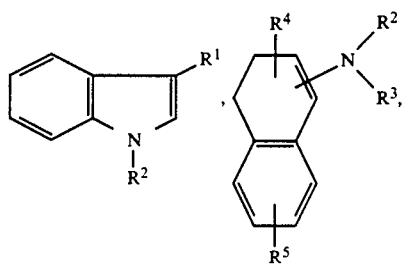

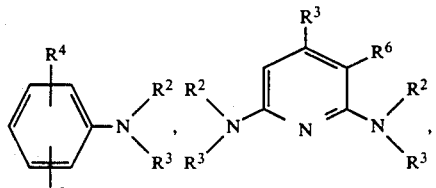

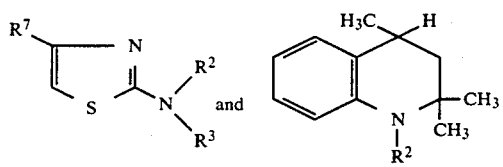

where $R^1$ is hydrogen, $C_1$-$C_8$-alkyl, phenyl, o-, m- or p-tolyl, o-, m- or p-chlorophenyl, benzyl or phenethyl; $R^2$ is hydrogen or $R^3$; $R^3$ is $C_1$-$C_6$-alkyl, allyl, methallyl, cyclohexyl, phenethyl, benzyl, phenyl, or $C_1$-$C_6$-alkyl substituted by chlorine, bromine, hydroxyl, $C_1$-$C_8$-alkoxy, phenoxy, cyano, carboxyl, $C_1$-$C_8$-alkanoyloxy, $C_1$-$C_8$-alkoxy-$C_1$-$C_4$-alkoxy, benzyoloxy, o-, m- or p-methylbenzoyloxy, o-, m- or p-chlorobenzoyloxy, $C_1$-$C_8$-alkoxyalkanoyloxy, phenoxyalkanoyloxy, $C_1$-$C_8$-alkoxycarbonyloxy, $C_1$-$C_8$-alkoxy-alkoxycarbonyloxy, benzyloxycarbonyloxy, phenethyloxycarbonyloxy, phenoxyethoxycarbonyloxy, $C_1$-$C_8$-alkylaminocarbonyloxy, cyclohexylaminocarbonyloxy, phenylaminocarbonyloxy, $C_1$-$C_8$-alkoxycarbonyl, $C_1$-$C_8$-alkoxyalkoxycarbonyl, phenoxycarbonyl, benzyloxycarbonyl, phenoxy-$C_1$-$C_4$-alkoxy or phenethoxycarbonyl; $R^2$ and $R^3$ together with the nitrogen form pyrrolidino, piperidino or morpholino; $R^4$ and $R^5$ independently of one another are each hydrogen, methyl, ethyl, propyl, methoxy, ethoxy, phenoxy, halogen, $C_1$-$C_4$-alkylsulfonylamino, $C_1$-$C_4$-dialkylaminosulfonylamino, $C_1$-$C_6$-alkanoylamino; $R^6$ is cyano, carbamyl, nitro, methoxycarbonyl, ethoxycarbonyl, n- or isopropoxycarbonyl, n-, iso- or sec-butoxycarbonyl, methoxyethoxycarbonyl, ethoxyethoxycarbonyl, n- or isopropoxyethoxycarbonyl or n-, iso- or sec-butoxyethoxycarbonyl, and $R^7$ is phenyl, $C_1$-$C_4$-alkyl, benzyl or phenyl mono- or polysubstituted by $C_1$-$C_{10}$-alkyl, $C_1$-$C_{10}$-alkoxy, phenoxy, benzoyloxy, phenyl, chlorine, bromine, nitro, $C_1$-$C_4$-alkoxycarbonyl, $C_1$-$C_4$-monoalkylamino, $C_1$-$C_4$-dialkylamino, $C_1$-$C_4$-alkoxyethoxy, $C_1$-$C_4$-alkylmercapto, phenylmercapto or $C_1$-$C_5$-alkanoylamino.

2. The compound as claimed in claim 1, of the formula:

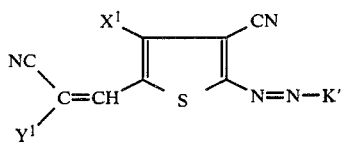

wherein K' is derived from HK' which is an aniline compound of the formula:

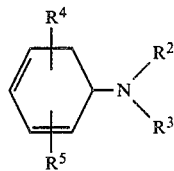

or a thiazole compound of the formula:

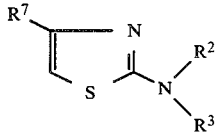

wherein $R^2$ is hydrogen or $R^3$, $R^3$ is $C_1$-$C_6$-alkyl, cyclohexyl, allyl, methallyl, phenethyl, benzyl, phenyl or $C_1$-$C_6$-alkyl substituted by chlorine, bromine, hydroxyl, $C_1$-$C_8$-alkoxy, phenoxy, cyano, carboxyl, $C_1$-$C_8$-alkanoyloxy, $C_1$-$C_8$-alkoxy-$C_1$-$C_4$-alkoxy, benzoyloxy, o-, m- or p-methylbenzoyloxy, o-, m- or p-chlorobenzoyloxy, $C_1$-$C_8$-alkoxyalkanoyloxy, phenoxyalkanoyloxy, $C_1$-$C_8$-alkoxycarbonyloxy, $C_1$-$C_8$-alkoxyalkoxycarbonyloxy, benzyloxycarbonyloxy, phenethyloxycarbonyloxy, phenoxyethoxycarbonyloxy, $C_1$-$C_8$-alkylaminocarbonyloxy, cyclohexylaminocarbonyloxy, phenylaminocarbonyloxy, $C_1$-$C_8$-alkoxycarbonyl, $C_1$-$C_8$-alkoxyalkoxycarbonyl, phenoxycarbonyl, benzyloxycarbonyl, phenoxy-$C_1$-$C_4$-alkoxy or phenethyloxycarbonyl; $R^2$ and $R^3$ together with the nitrogen form pyrrolidino, piperidino or morpholino; $R^4$ and $R^5$ independently of one another are each hydrogen, methyl, ethyl, propyl, methoxy, ethoxy, phenoxy, halogen, $C_1$-$C_4$-alkylsulfonylamino, $C_1$-$C_4$-dialkylaminosulfonylamino, or $C_1$-$C_6$-alkanoylamino; and $R^7$ is phenyl, mono- or polysubstituted by $C_1$-$C_{10}$-alkyl, $C_1$-$C_{10}$-alkoxy, phenoxy, benzoyloxy, phenyl, chlorine, bromine, nitro, $C_1$-$C_4$-alkoxycarbonyl, $C_1$-$C_4$-monoalkylamino, $C_1$-$C_4$-dialkylamino, $C_1$-$C_4$-alkoxyethoxy, $C_1$-$C_4$-alkylmercapto, phenylmercapto or $C_1$-$C_5$-alkanoylamino, $C_{1-4}$ alkyl, $C_1$-$C_4$-alkoxycarbonylmethyl, cyanomethyl or benzyl; X is hydrogen, $C_{1-8}$-alkyl, benzyl, phenethyl, or thienyl, furyl or phenyl which is unsubstituted or substituted by chlorine, bromine, methyl, ethyl, methoxy or ethoxy, and Y' is cyano, $COOCH_3$, $COOC_2H_5$, $COOC_3H_7$, $COOC_4H_9$, $COOC_6H_{13}$, $COOC_8H_{17}$, $COOCH_2CH(C_4H_9(C_2H_5))$, $COOC_2H_4OCH_3$, $COOC_2H_4OC_2H_5$, $COOC_2H_4OC_4H_9$, $COOC_6H_5$, $COOC_6H_4CH_3$, $CONHCH_3$, $CONHC_2H_5$, $CONHC_4H_9$, $CONHC_6H_{13}$, $CONHC_8H_{17}$, $CON(CH_3)_2$, $CON(C_2H_5)_2$, $CON(C_4H_9)_2$, $CON(CH_3)(C_2H_5)$,

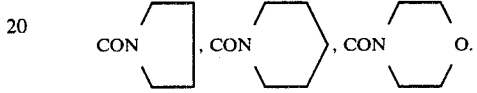

3. The compound as claimed in claim 2, wherein said radical K is derived from a compound selected from the group consisting of

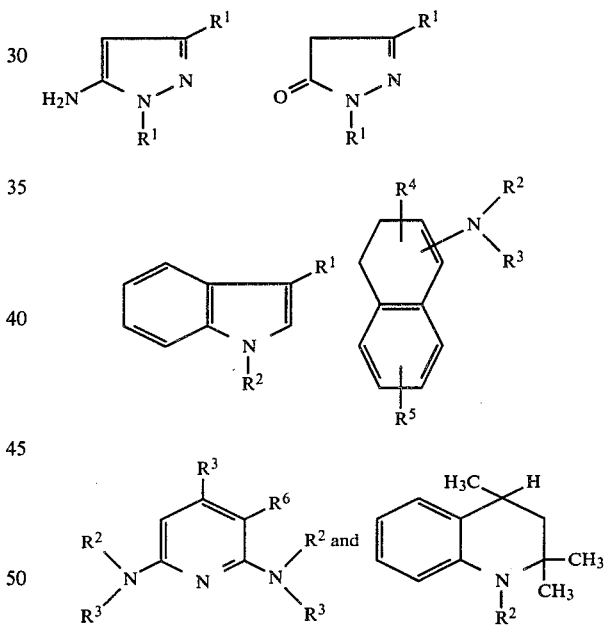

wherein R is hydrogen, alkyl, aralkyl or aryl; $R^2$-$R^5$ and $R^7$ are as defined in claim 2 and $R^6$ is cyano, carbamyl, nitro or carbalkoxy.

4. The compound as claimed in claim 2, wherein said radicals $R^2$ and $R^3$ together form a pyrrolidino, piperidino or morpholino.

5. The compound as claimed in claim 3, wherein said radicals $R^2$ and $R^3$ together form a pyrrolidino, piperidino or morpholino.

6. The compound of claim 2, wherein said $R^4$ and $R^5$ radicals are selected from the group consisting of hydrogen, methyl, ethyl, propyl, bromine, chlorine, methoxy, ethoxy, phenoxy, benzyloxy, $C_{1-6}$alkanoylamino, benzylamino, $C_{1-4}$alkylsulfonylamino and $C_{1-4}$dialkylaminosulfonylamino.

7. The compound of claim 3, wherein said $R^4$ and $R^5$ radicals are selected from the group consisting of hydrogen, methyl, ethyl, propyl, bromine, chlorine, methoxy, ethoxy, phenoxy, benzyloxy, $C_{1-6}$alkanoylamino, benzylamino, $C_{1-4}$alkylsulfonylamino and $C_{1-4}$dialkylaminosulfonylamino.

8. The compound as claimed in claim 3, wherein said $R^6$ radical is aminocarbonyl, methylaminocarbonyl, dimethylaminocarbonyl, ethylaminocarbonyl, diethylaminocarbonyl, methoxycarbonyl, ethoxycarbonyl, n- and isopropoxycarbonyl, n-, iso- and sec-butoxycarbonyl, methoxyethoxycarbonyl, ethoxyethoxycarbonyl, n- and isopropoxyethoxycarbonyl or n-, iso- or sec-butoxyethoxycarbonyl.

9. The compound claimed in claim 2, wherein said substituted alkyl is $C_{1-6}$alkyl substituted by chlorine, bromine, hydroxyl, $C_1$-$C_8$-alkoxy, phenoxy, cyano, carboxyl, $C_1$-$C_8$-alkanoyloxy, $C_1$-$C_8$-alkoxy-$C_1$-$C_4$-alkoxy, benzoyloxy o-, m- or p-methylbenzoyloxy, o-, m- or p-chlorobenzoyloxy, $C_1$-$C_8$-alkoxyalkanoyloxy, phenoxyalkanoyloxy, $C_1$-$C_8$-alkoxycarbonyloxy, $C_1$-$C_8$-alkoxyalkoxycarbonyloxy, benzyloxycarbonyloxy, phenethyloxycarbonyloxy, phenoxyethoxycarbonyloxy, $C_1$-$C_8$-alkylaminocarbonyloxy, cyclohexylaminocarbonyloxy, phenylaminocarbonyloxy, $C_1$-$C_8$-alkoxycarbonyl, $C_1$-$C_8$-alkoxyalkoxycarbonyl, phenoxycarbonyl, benzyloxycarbonyl, phenoxy-$C_1$-$C_4$-alkoxy or phenethyloxycarbonyl, said aryl radical is phenyl, said aralkyl radical is benzyl or phenethyl and said cycloalkyl radical is cyclohexyl.

* * * * *